: 3,466,174
Patented Sept. 9, 1969

3,466,174
BREAD FLAVOR
Robert H. Bundus, Evanston, and Anthony J. Luksas, Chicago, Ill., assignors to Beatrice Foods Co., Chicago, Ill., a corporation of Delaware
No Drawing. Filed July 25, 1966, Ser. No. 567,371
Int. Cl. A21d 2/00
U.S. Cl. 99—90                                                                 9 Claims

ABSTRACT OF THE DISCLOSURE

A synthetic bread flavor is prepared by growing yeast on a medium consisting essentially of whey and containing 6% to 40% total solids with intimate mixing of air with the medium throughout the growth period of 14 to 24 hours.

---

The present invention relates to an improvement in the manufacture of bread.

The bread industry is continually shortening the time in the process of manufacturing bread. Unfortunately, however, much of the bread flavor is lost as a result of the shortening of time. Also bread made by the use of chemical leavening agents does not have the desired bread flavor.

Accordingly it is an object of the present invention to impart bread flavor to bread which would otherwise be deficient in such flavor.

Another object is to develop a method of artifically imparting bread flavor in the bread making operation.

An additional object is to prepare bread flavor which does not require the manufacture of bread.

A further object is to prepare a dry bread flavor which can be distributed as such and which can be added to the ingredients employed in the manufacture of bread or can be otherwise employed to impart a bread flavor to food.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

It has now been found that these objects can be attained by growing a culture of yeast in whey. For best results there is employed a mixture of yeast with nontoxic bacteria of the coccus family, more specifically enterococcus of serological group D and Streptococci of group N and Lactobacilli. It has been found that a synergistic effect occurs by use of this specific combination of organisms whereby there is a greatly enhanced production of bread flavor over that obtained by yeast alone. The enterococcus alone does not develop significant bread flavor when cultured on whey.

As the yeast there can be used, for example, Saccharomyces, such as *Saccharomyces cerevisiae* (bakers' yeast), or any yeast that can be grown on lactic acid or lactose.

A useful combination of yeast and enterococcus serological group D occur together in a commercial product called Citron.

Whey as is recognized in the art is a by-product in the manufacture of cheese such as cottage cheese, cheddar cheese, Swiss cheese, Neufchatel cheese and cream cheese, for example. Whey contains lactalbumin, casein fines, lactose and lactoglobulin. The preferred whey is cottage cheese whey.

The protein nitrogen content of the whey can be enhanced by the use of nitrogen sources such as ammonium nitrate, potassium nitrate, sodium nitrate or ammonium phosphate. Preferably diammonium phosphate is added to the whey culture because it gives better growth. Usually 0.1 mole of diammonium phosphate is used per liter of whey but this can be increased or decreased if desired, e.g., there can be used 0.2 mole/liter or 0.01 mole/liter.

The whey culture medium preferably has 6 to 40% total solids. As the solids increase from 30 up to 40% the growth activities of the yeast, or yeast coccus organisms, decrease rapidly terminating in no growth.

The yeast or yeast coccus inoculated whey culture is intimately mixed with a large quantity of air. The air is mixed into the system in any conventional fashion, e.g., with a high speed impeller. Air is bubbled through the culture throughout the growth period. Preferably growth is continued for 14 to 18 hours at 86° F. although shorter times, e.g., 10 or 12 hours can be employed or longer times, e.g., 24 hours.

Usually by the end of the growth stage 5% of the volume of the product is yeast.

The product which has developed the bread flavor can be dried directly. However, if it contains over 50% water by weight it has been found desirable to concentrate it to 50% or less volume, e.g., 30% or 40% to improve drying efficiency. This concentration is preferably carried out at 112 to 130° F. in a vacuum. The product can then be spray dried. Alternatively, the product is cooled to 110° F. seeded with α-lactose, e.g., of 300 mesh (Tyler series) in an amount of 0.05% by weight and cooled to 70° F. or lower to force crystallization. The concentrate including the crystals is then spray dried at 80° F. The seeding with the α-lactose gives better drying characteristics as well as improved color and solubility.

The dried product is then normally hydrated at the time it is to be used as a flavor supplement in yeast raised doughs or as a flavor additive in chemically leavened doughs, e.g., refrigerator doughs or dry biscuit mixes. When chemically leavened doughs are employed the bread flavor is supplied entirely by the bread flavor additive of the present invention.

The yeast containing bread flavoring additive can be added to the bread dough in an amount of 0.5% up to 15% of the flour. 6% of the flavoring agent based on the flour appears to be optimum.

Unless otherwise indicated, all parts and percentages are by weight.

The bread flavor additive can be added to bread of various types, e.g., white bread, rye bread, biscuits, rolls, whole wheat bread, raisin bread, bagels. It can also be employed to impart a bread flavor to non-bread foods, e.g., to rice stuffing for turkeys and other fowl, dips made from cheese or sour cream, etc.

Example 1

A large batch (300 liters) of cottage cheese whey having 16% total solids was pasteurized and then inoculated with the yeast-enterococcus (serological group D) mixture described above and vigorously aerated in a 100 gal. vat with a Cowles dissolver for 18 hours at 85° F. The resultant product was very strong in bread flavor and the product was spray dried to a powder. When the powder was used as a flavor source in chemically leavened bread it yielded bread possessing a yeast-raised flavor.

Example 2

The procedure of Example 1 was repeated but there was added 30 moles of diammonium phosphate to the whey prior to adding the yeast-enterococcus culture. The yield of the spray dried bread flavor was increased substantially.

Example 3

The procedure of Example 1 was repeated by adding *Saccharomyces cerevisiae* without the enterococcus to the culture medium. There was a reduced bread flavor in the spray dried product although it was still significant.

Example 4

2 cups of scalded milk was cooled until it was lukewarm. Then there was added 1 cake of compressed yeast, 3 cups of flour, 1 tablespoon of salt, 2 tablespoons of sugar, 2 tablespoons of vegetable shortening and ⅓ cup of the spray dried bread flavor produced in Example 1. The mixture was beaten and then 3 more cups of flour were added gradually. The batter was then tossed on a floured board and kneaded until smooth and elastic. It was put in a bowl and allowed to rise to double its height at 80° F., cut and allowed to double in height again and then baked for 45 minutes at 350° F. to finish the making of the bread having an excellent bread flavor.

Example 5

There were sifted together 2 cups of flour, ¼ cup of sugar, 3 teaspoons of baking powder, ½ teaspoon of salt, ¼ cup of vegetable shortening and 2 tablespoons of the spray dried bread flavor of Example 1. There was then added 1 egg and 1 cup milk and the ingredients thoroughly mixed with an electric blender. The mixture was then poured into greased muffin cups until they were ⅔ full and baked for 25 minutes at 400° F. to produce muffins having a bread flavor.

Example 6

There were mixed together 2¼ cups of lukewarm scalded milk, 4 tablespoons of butter, 2 tablespoons of sugar, 1 egg, 1 teaspoon of salt, 5½ cups of self-rising flour and ⅓ cup of the spray dried bread flavor of Example 1. After thorough mixing the dough was shaped into rolls and baked for 20 minutes at 375° F. to produce finished rolls having a good bread flavor.

What is claimed is:

1. A process of preparing a synthetic bread flavor comprising growing yeast on a medium consisting essentially of whey, wherein the whey medium has from 6% to 40% total solids therein, by intimately mixing the whey medium with air throughout the growth period of from 14 to 24 hours at above room temperature.
2. A process comprising drying the bread flavor produced in claim 1.
3. A process according to claim 2 wherein the drying is spray drying.
4. A process according to claim 1 wherein the whey is cottage cheese whey and including the step of drying the bread flavor.
5. A process according to claim 1 wherein there is grown on the whey medium a mixture of the yeast and enterococcus of serological group D.
6. A process according to claim 5 including the additional step of spray drying the bread flavor.
7. A process of imparting bread flavor to a flour containing product comprising adding to the product the bread flavor of claim 1 in amounts of from .5% to 15% of the flour in the said product.
8. A process according to claim 7 wherein the flour containing product is a bread formulation.
9. A process according to claim 8 wherein the bread formulation includes a chemical leavening agent and is devoid of yeast as a leavening agent.

References Cited

UNITED STATES PATENTS

| | | | |
|---|---|---|---|
| 2,449,064 | 9/1948 | Engel | 99—35 |
| 2,465,870 | 3/1949 | Hanson et al. | 195—82 |
| 2,762,749 | 9/1956 | Myers et al. | 195—82 XR |
| 2,969,289 | 1/1961 | Matz et al. | 99—90 |
| 3,102,033 | 8/1963 | Jackel | 99—90 |

RAYMOND N. JONES, Primary Examiner

JAMES R. HOFFMAN, Assistant Examiner

U.S. Cl. X.R.

99—140